Figure 1:
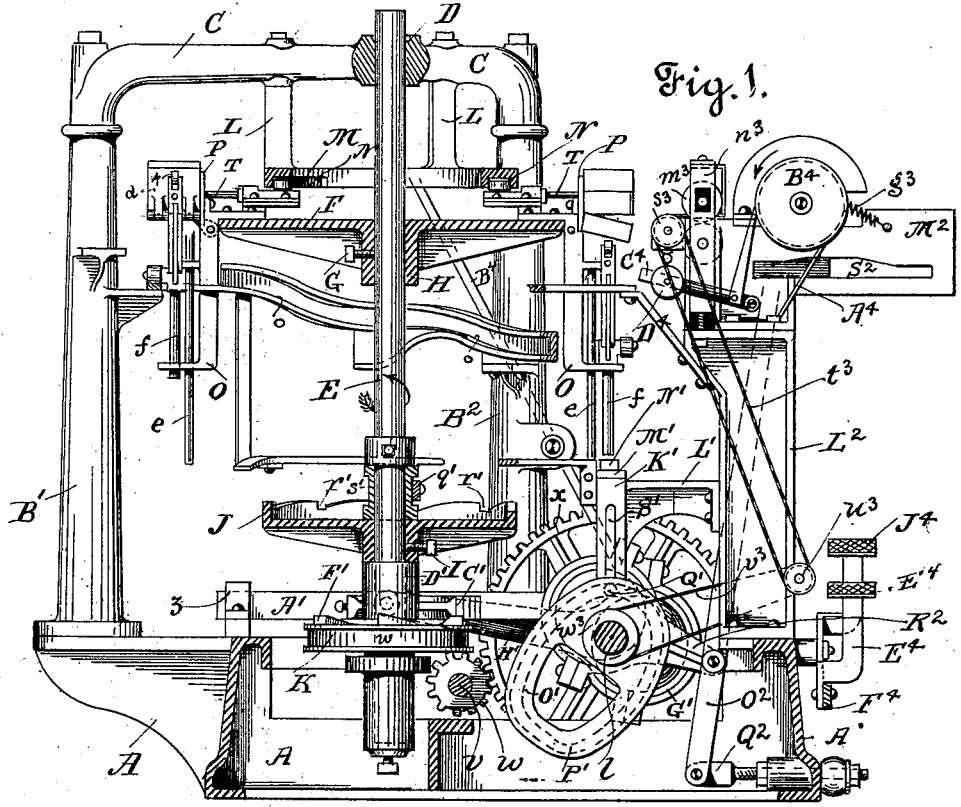

(No Model.) 7 Sheets—Sheet 1.

C. B. KENDALL & H. SCHAAKE.
CAN SEAMING MACHINE.

No. 489,484. Patented Jan. 10, 1893.

Witnesses.

Inventors
Charles B. Kendall
Henry Schaake
By N. A. Acker
Atty (No Model.) 7 Sheets—Sheet 2.
C. B. KENDALL & H. SCHAAKE.
CAN SEAMING MACHINE.
No. 489,484. Patented Jan. 10, 1893.
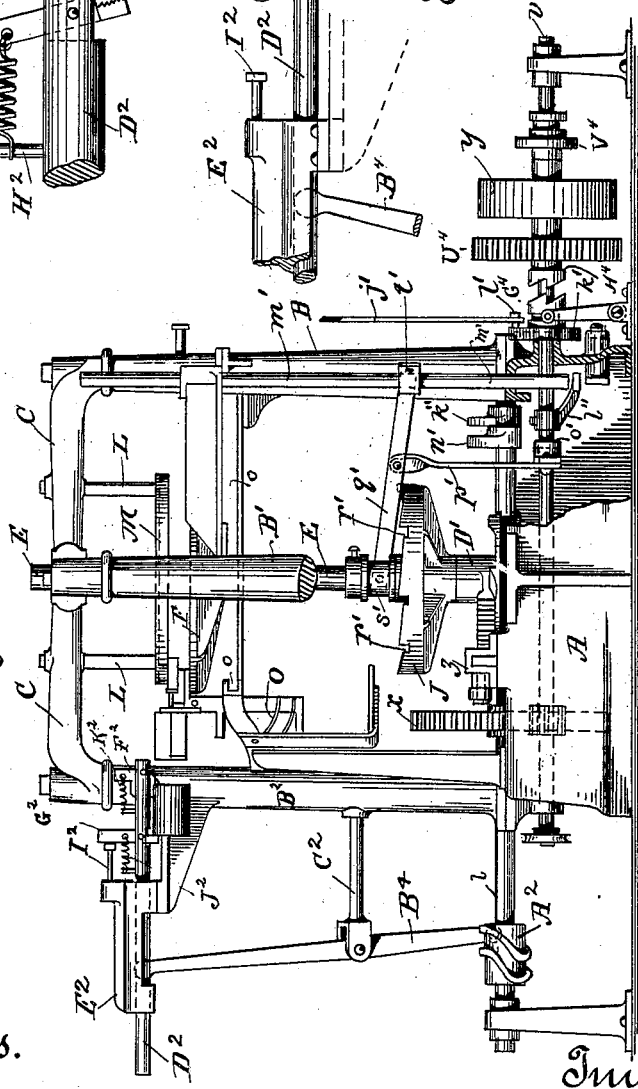
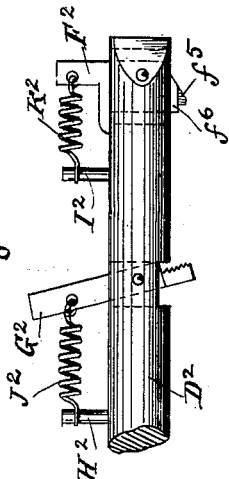
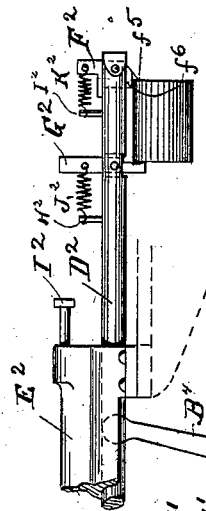
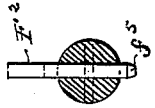
Witnesses.
Inventors
Charles B. Kendall
Henry Schaake
By N. A. Acker Atty (No Model.) 7 Sheets—Sheet 3.

C. B. KENDALL & H. SCHAAKE.
CAN SEAMING MACHINE.

No. 489,484. Patented Jan. 10, 1893.

Witnesses.
Inventors
Charles B. Kendall
Henry Schaake (No Model.) 7 Sheets—Sheet 4.
C. B. KENDALL & H. SCHAAKE.
CAN SEAMING MACHINE.

No. 489,484. Patented Jan. 10, 1893.

Witnesses.
Inventors
Charles B. Kendall
Henry Schaake (No Model.) 7 Sheets—Sheet 5.
C. B. KENDALL & H. SCHAAKE.
CAN SEAMING MACHINE.
No. 489,484. Patented Jan. 10, 1893.
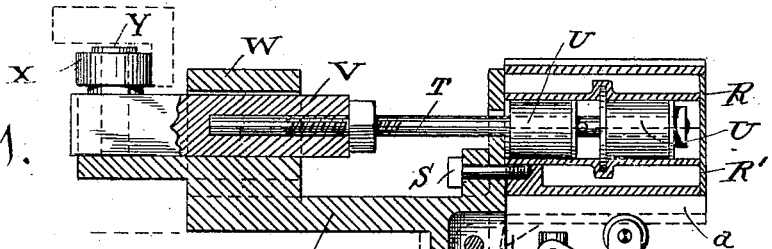
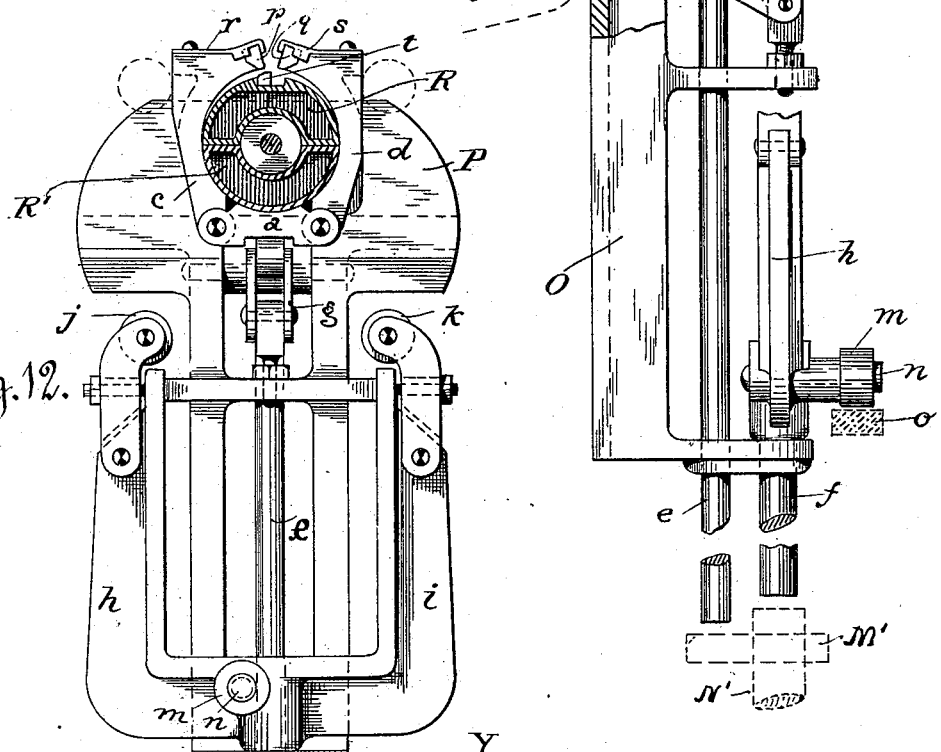
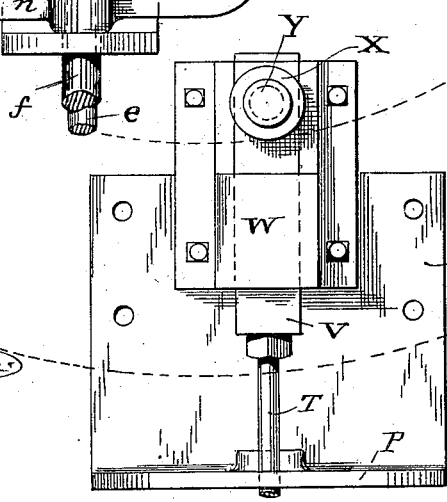
Witnesses.
Inventors
Charles B. Kendall
Henry Schaake
By Naacker
Atty (No Model.) 7 Sheets—Sheet 6.
C. B. KENDALL & H. SCHAAKE.
CAN SEAMING MACHINE.
No. 489,484. Patented Jan. 10, 1893.
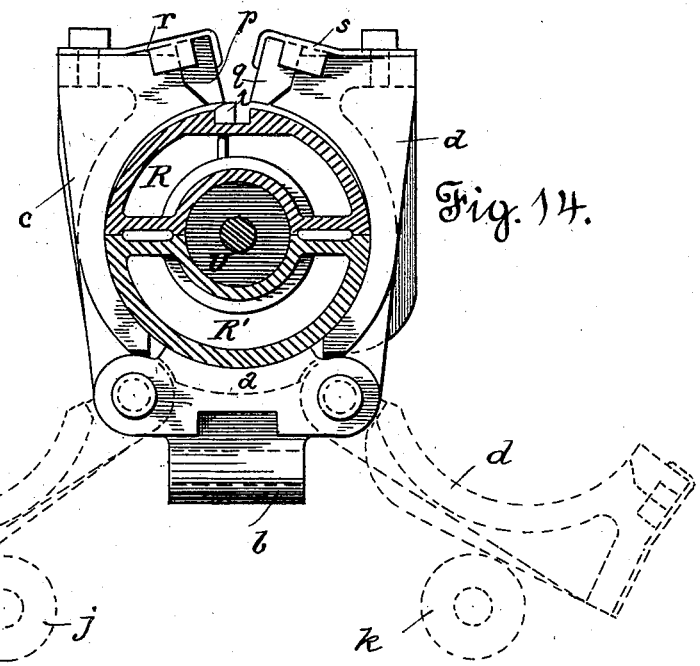
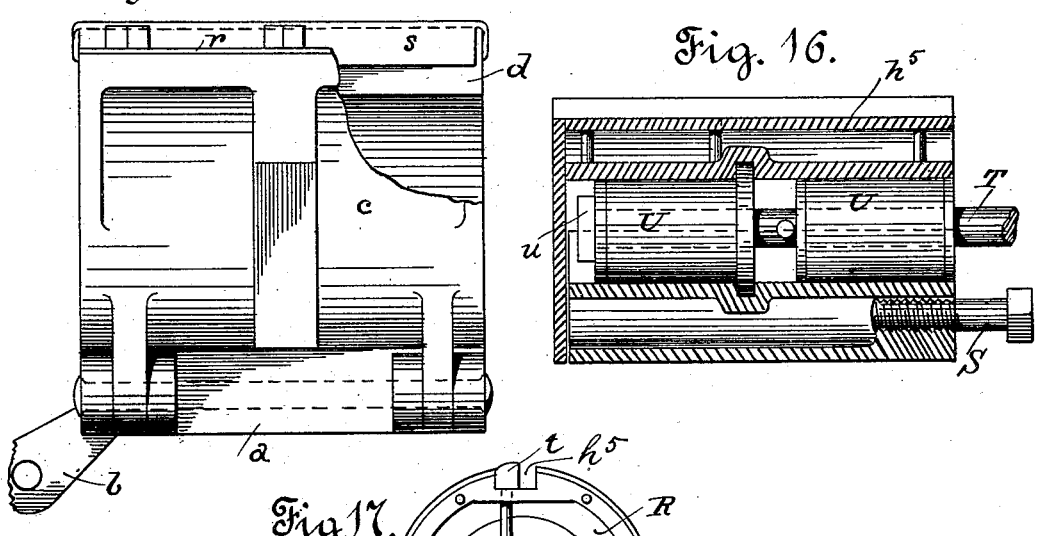
Witnesses.
Inventors
Charles B. Kendall
Henry Schaake
By N. A. Acker atty (No Model.) 7 Sheets—Sheet 7.
C. B. KENDALL & H. SCHAAKE.
CAN SEAMING MACHINE.
No. 489,484. Patented Jan. 10, 1893.
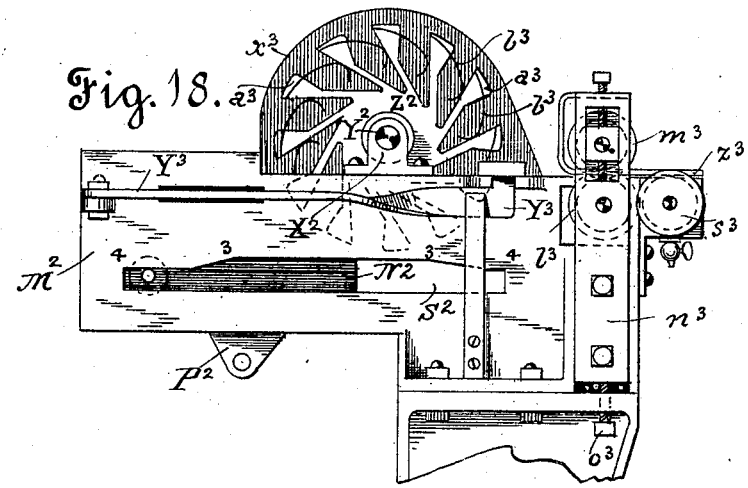
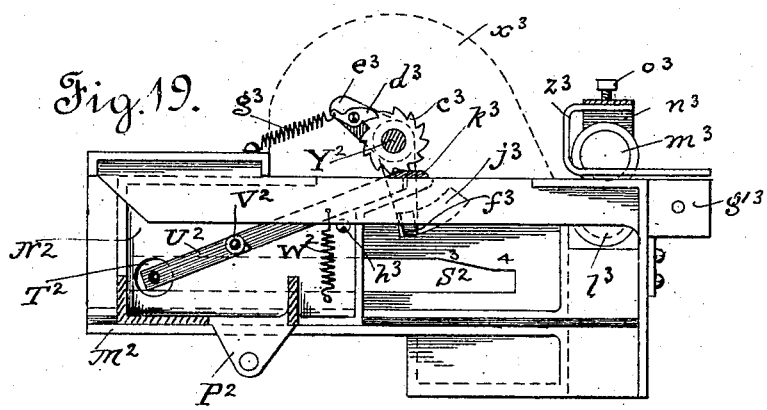
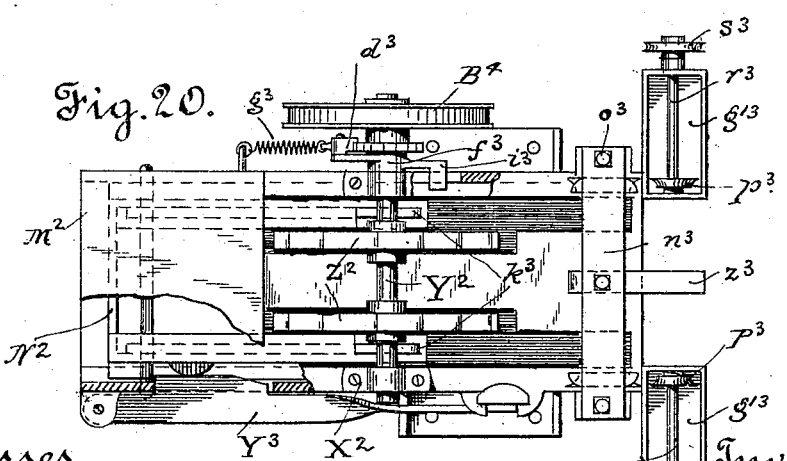

UNITED STATES PATENT OFFICE.

CHARLES B. KENDALL, OF NEWTON, MASSACHUSETTS, AND HENRY SCHAAKE, OF BALTIMORE, MARYLAND; SAID SCHAAKE ASSIGNOR TO SAID KENDALL, OF SAN FRANCISCO, CALIFORNIA.

CAN-SEAMING MACHINE.

SPECIFICATION forming part of Letters Patent No. 489,484, dated January 10, 1893.

Application filed April 29, 1892. Serial No. 431,116. (No model.)

*To all whom it may concern:*

Be it known that we, CHARLES B. KENDALL, residing at Newton, in the county of Middlesex and State of Massachusetts, and HENRY SCHAAKE, residing at Baltimore, State of Maryland, citizens of the United States, have invented certain new and useful Improvements in Seaming-Machines; and we do hereby declare the following to be a full, clear, and exact description of said invention.

This invention has relation to certain new and useful improvements in can seaming machines, which consists in the arrangement of parts and details of construction as will be hereinafter more fully set forth in the drawings, described and pointed out in the specification.

The essential features of our invention are as follows—first, an improved feed device for supplying body blanks to clamp jaws, which consists of a delivery wheel carrying a series of spring clip arms adapted to hold and carry a number of body blanks, of a sliding frame provided with nipper arms for receiving, holding, and carrying forward the body blanks with the travel of the sliding frame, mechanism for truing the blanks within the delivery wheel prior to engagement with the nipper arms, crimp rollers for crimping the edges or ends of blanks during forward movement, and of fluxing rolls for fluxing the crimped portion of blanks prior to delivery to mandrel; second, in mechanism for imparting reciprocating motion to soldering irons; third, device for raising soldering irons during stoppage of machinery and lowering of same with starting thereof independent of mechanism for alternately raising and lowering soldering irons during working of machinery; fourth, in the mechanism for withdrawing the soldered body from the mandrel during the travel thereof; fifth, in providing spring clamp tiles for clamping jaws; and sixth, frictional clutch brake mechanism for gradually stopping the throw of the central shaft in order to obviate jarring of the machine when the lock bar moves into engagement with the lock plate for purpose of holding the clamp jaws directly beneath the solder irons and permitting accurate feed of blanks from the delivery wheel to the mandrel.

Figures 2, 3:
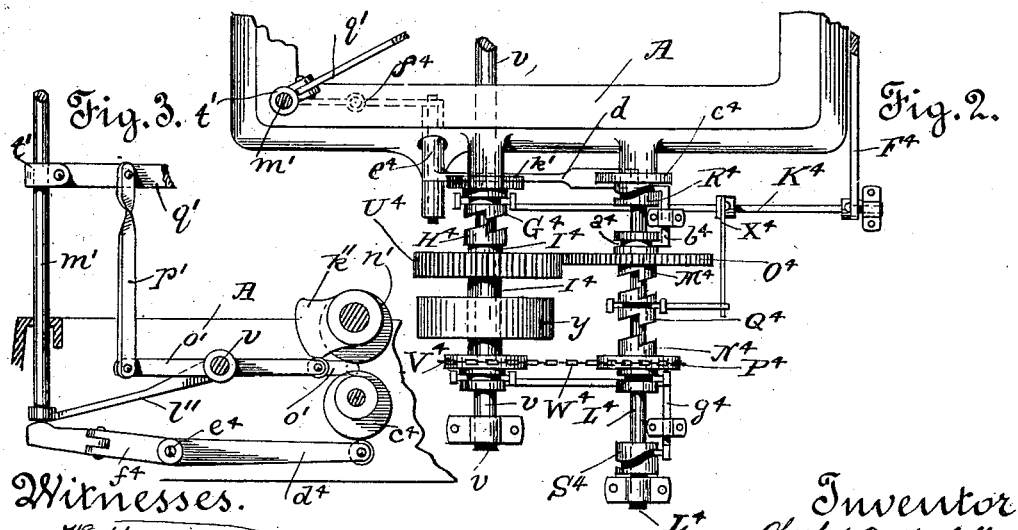
Figure 5:
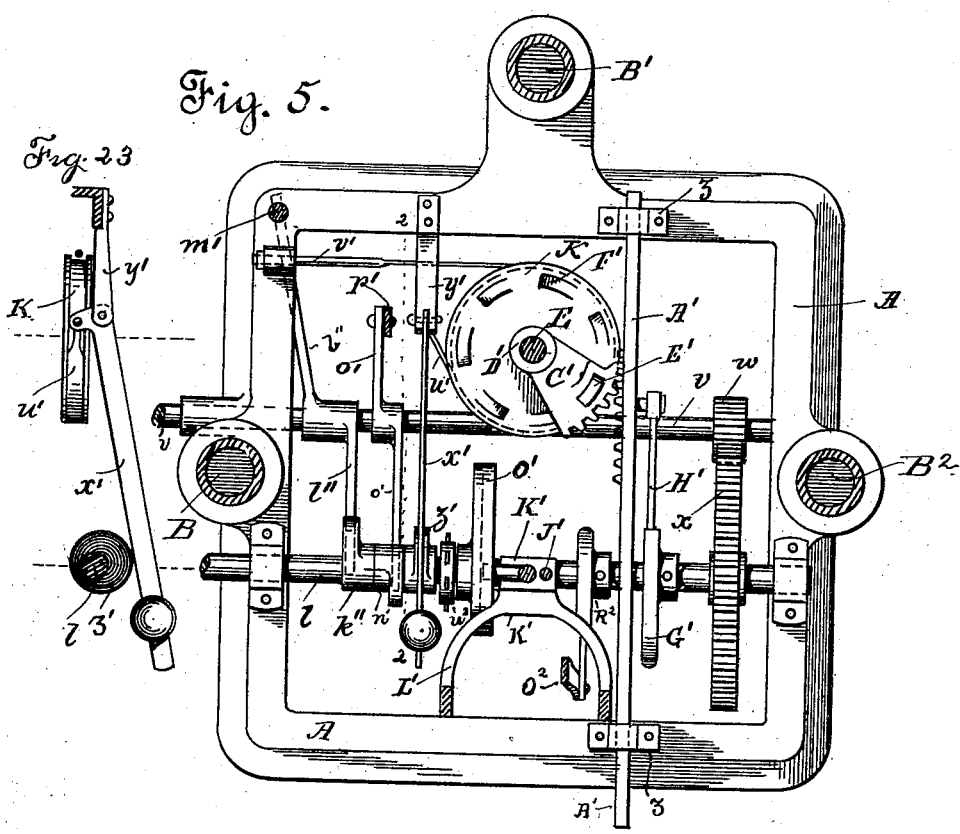
Figure 6:
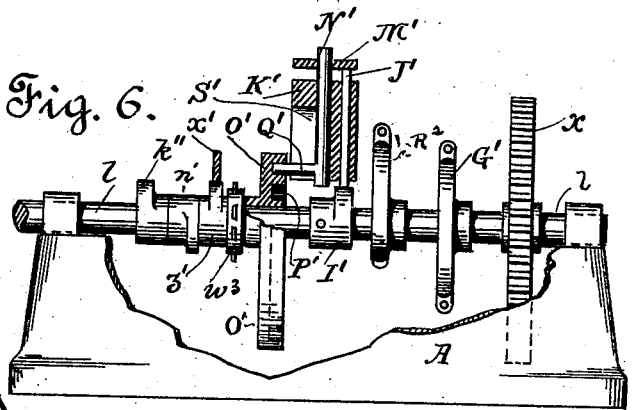
Figure 10:
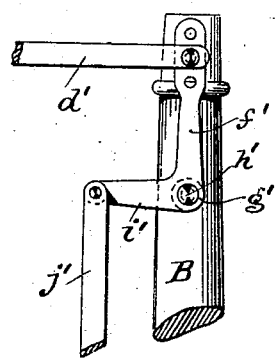
Figure 8:
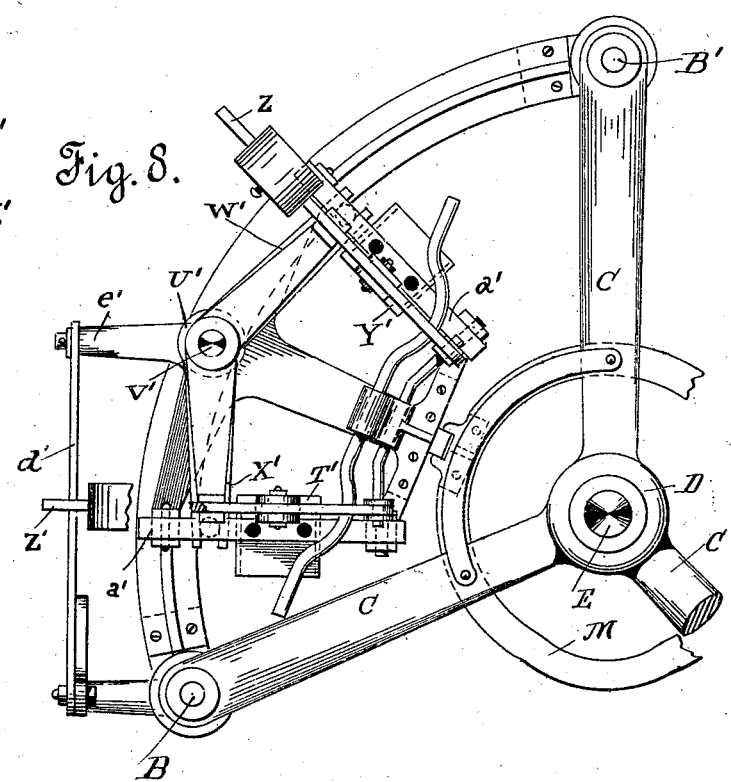
Figure 9:
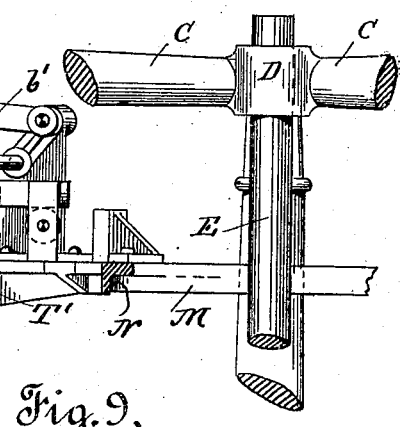

Referring to the drawings forming a part of this application, wherein similar letters of reference are used to denote corresponding parts throughout the entire specification and several views—Figure 1, is a longitudinal sectional elevation of the machine; Fig. 2, a detail top plan of the raising or lifting mechanism for the soldering iron; Fig. 3, side elevation on line 1—1, Fig. 2; Fig. 4, a rear view in elevation, partly broken away; Fig. 5, cross sectional top plan; Fig. 6, front elevation of main shaft, showing relative position of operating cams and eccentrics; Fig. 7, an end view of Fig. 21; Fig. 8, top plan showing soldering iron mechanism; Fig. 9, broken end elevation of Fig. 8; Fig. 10, detail view, partly broken away, of the operating lever for soldering irons; Fig. 11, side elevation showing mandrel clamps and expansion rod for mandrel; Fig. 12, front elevation of Fig. 11; Fig. 13, top plan of Fig. 11, showing sliding rod for expanding mandrel; Fig. 14, end view of mandrel, illustrating clamp jaws closed and opened; Fig. 15, side elevation of clamp jaw; Fig. 16, longitudinal sectional view of mandrel; Fig. 17, end view of mandrel; Fig. 18, side elevation partly broken away of feed device; Fig. 19, similar view with side of casing removed; Fig. 20, top plan of Fig. 18; Fig. 21, detail view of can releasing clamp; Fig. 22, a similar view showing can held between releasing clamp; and Fig. 23, longitudinal sectional view in side elevation, taken on line 2—2, Fig. 5.

The letter A, is used to indicate the frame of our machine from which upwardly extends the supporting columns B, B', B², of which three are used, although more may be if so desired. These columns are united by arms C, which meet around the central hub or bearing D.

Centrally through the machine extends the vertical main shaft E, which works in the bearing hub D, and the bearing formed in the lower portion of the frame, and the said shaft is given a step rotation through the medium of hereinafter described mechanism. To the upper portion of this shaft is secured a carrying disk F, by means of a set screw G, which passes through the sleeve H, to the shaft, clearly shown in Fig. 1. We also secure to said shaft, through the set screw I, the lock plate J, which serves to lock and hold the main shaft after having made or taken one rotatable step, which serves to bring the mandrel in position to have pressed therearound the can body blank and to assure the formed can body coming directly under, or in line with, the solder iron.

From the uniting arms C, downwardly extend the arms L, which support the plate M, through which centrally passes the main shaft E, as shown. This plate is held rigid or immovable, and is provided with an eccentric groove N, which serves to draw the expanding rod for the mandrel in or out as will be more fully set forth.

To the periphery of carrying disk F, is secured a series of depending supporting brackets O, of which any number may be employed. By preference we use about eight and inasmuch as each is a fac-simile of the other, detail description of one will suffice. To back plate P of said bracket is secured a hollow mandrel or former, which is composed of two parts R, R'. This former or mandrel is attached to said back plate by means of a bolt or set screw S, and through said plate works the expanding rod T, which extends into the mandrel through the elastic cushion U, located interiorly therein between the sections. The inner portion of said rod or expander is secured to the sliding block V working through the opening formed in the projecting flange W, of the bracket O.

To the end of the sliding block V, is secured a roll X, through medium of pin Y. This roll fits and works within the eccentric groove N of the plate M, consequently it is obvious that as the carrying frame F is rotated, by the rotation of shaft E, the roll moves within the eccentric groove of the stationary plate M, and causes the sliding block V, and the rod P, to move in or out in order to expand or collapse the mandrel for the purpose of causing the can body blanks to entirely fill the closed jaws in order to give proper size to the vessel body, or to permit the ready removal of the formed body from mandrel.

Around mandrel R, is adapted to be closed the clamp jaws for the body blank, in order to force same to correspond to contour of said mandrel. These jaws we make by preference in three sections the lower section $a$, of which is secured to plate P, of the bracket O by means of the hinge $b$, and to section $a$, is hinged side sections $c$, $d$, as clearly shown in Figs. 12 and 14. These sections are raised in order to clamp the body blanks as delivered from the feed table, by means of rods $e$, $f$. Rod $f$, is provided with yoke arms $h$, $i$, which have secured thereto rolls $j$, $k$.

Through the medium of the hereinafter described cam and eccentric located on rotating shaft $l$, the rod $e$, is first raised, which contacts with under surface of section $a$, and lifts the same until the vessel body blank is firmly held against mandrel, which holds said blank in a horizontal position. After section $a$, has been lifted its full distance, rod $f$ is raised, which causes the yoke arms $h$, $i$, to move upward and during the travel thereof, rolls $j$, $k$, contact with sides of sections $c$, $d$, and cause the gradual closing thereof, which forces the vessel blanks around the mandrel. The rods and clamp jaws are held in this position by means of roll $m$, secured to rod $f$, by shaft $n$, which travels upon the trackway $o$, secured to the inner face of the supporting column, and the lock link $g$. This trackway runs for a given distance upon a level and thence gradually declines, shown in Fig. 4, in order to lower rods $e$, $f$, and allow of the clamp jaws opening for the purpose of permitting the withdrawal of the completed vessel body, from mandrel which will be more fully set forth. Faces of jaws $c$, $d$, we provide with tiles $p$, $q$, which are secured thereto by means of spring clamps $r$, $s$. These clamp tiles prevent the faces of the jaws from becoming worn by contact with soldering irons, consequently save destruction of the entire jaw, which would result in case wear were allowed by contact with irons. By providing removable clamp tiles we are enabled upon wear thereof to insert others readily in place, thus saving the entire jaw. In case one tile becomes broken another may quickly be substituted therefor. The face of mandrel section R, is provided with projecting or raised lip $t$, which insures perfect meeting of blank edges in order to provide a neat seam to the vessel, besides forming a solid bearing for soldering irons. The expanding rod T, is prevented from being withdrawn from within the elastic cushion of mandrel by means of the lock nut $u$, fully shown in Figs. 16, and 17.

The foregoing mechanism is operated by means of the transverse shaft $v$, which has secured thereon small gear wheel $w$, which meshes with the larger gear $x$, located on the shaft $l$. Motion is imparted to the transverse operating shaft $v$, in any suitable manner, as by means of a power belt working over the pulley wheel $y$, mounted on the outer end thereof. As said shaft is rotated, motion thereof is imparted to shaft $l$, through the medium of the gear wheels $w$, $x$. Upon this shaft there is located a series of cams and eccentrics which serve the purpose of transmitting motion and operating the several features of our machine, each of which will be described and fully pointed out. It must be understood that each of the cams and eccentrics work respective features and parts of the machine during rotation of shaft $l$, consequently by the hereinafter expression "further rotation of said shaft" (or similar expression), is intended to be understood that as the shaft $l$, continues to rotate. Both shafts $v$, and $l$, work within suitable bearings formed in frame A.

Secured to the frame by means of straps $z$, is a rack bar A', the teeth of which engage with teeth of segment C'. This segment is secured loosely upon the central shaft E, by means of the sleeve D′, and is adapted to partially rotate the ratchet plate K, upon its forward movement by means of the pawl E′, engaging with ratchet teeth F′. Consequently as segment C′, moves forward a partial rotation is given to the ratchet plate which being in turn rigidly secured to the central shaft, carries the same therewith. Eccentric G′, mounted upon shaft *l*, is connected to rack bar A′, by means of pitman H′, consequently as shaft *l*, rotates, eccentric G′, is carried thereby and by means of pitman H′, moves the rack bar forward and backward. As said bar moves forward the ratchet plate or wheel K, as before described, is partially rotated, but while the same moves backward the ratchet plate remains stationary, inasmuch as the pawl E′, passes over and does not engage with teeth F′. During rotation of shaft *l*, cam I′, raises rod J′, working through the block K′, secured to the machine by means of the bracket L′. This rod is secured to the plate M′, consequently as rod J′, is raised or lowered by contact with cam I′, during its rotation, plate M′, is likewise carried. As this plate moves upward it contacts with rod *e*, which serves to lift clamp section *a* Through the block K′ also works the rod N′, which as raised contacts with the rod *f*, and causes the uplifting thereof in order to close the clamping jaws *c*, *d*. Rod N′, is operated by the eccentric O′, which is provided with the groove P′, into which fits the pin Q′, projecting through the slot S′, cut in the block K′, consequently as eccentric O′, is rotated, rod N′, is raised or lowered by the projecting pin Q′, which works in the slot P′.

As before stated any number of mandrels and clamps may be secured and carried by the frame carrying disk F, and inasmuch as said disk is secured to the central shaft E, it is obvious that as the shaft E, is rotated one step, by the rack and pawl mechanism described, the mandrel and clamp jaws move and advance likewise a step, consequently moving the jaws and mandrel, which hold and carry a formed vessel body blank from within front of the feed table to the soldering feed device, which being of usual form calls for no specific description herein. After wire solder has been fed to the clamp jaws, the clamped body is carried beneath the solder iron T′, by further rotation having been imparted to the central shaft. The soldering iron is given a reciprocating motion through the medium of the rocking lever U′, which is pivotally secured to the frame by means of the pin V′. The rocking bar is provided with arms W′, X′, the end of which we secure to each of the soldering irons. As the arm X′, is thrown inward, the soldering iron T′, is likewise moved, while the soldering iron Y′, is moved outward with outward throw of arm W′, thus causing reciprocation of the soldering irons. The soldering irons are held firmly upon the clamped vessel body blanks by means of pivotal weight rods Z′, which are secured to the machines as shown in Figs. 8 and 9. These rods bear firmly upon soldering irons through the medium of roll *b′*.

The usual heating chamber *c′*, is secured to soldering iron T′, to which gas is supplied in the ordinary manner, which forms no part of our invention. The soldering irons are secured to the rocking lever arms by means of bar *a′*, and are reciprocated by means of rod *d′*, secured to arm *e′*, of the rocking lever, and arm *f′* of crank lever *g′*. This lever is pivoted to column B, by pin *h′*, and arm *i′* is connected to operating rod *j′*, which is raised and lowered by means of cam *k′*, secured upon shaft *v*, and to which rod *j′* is connected by means of wrist pin *l′*, consequently as said cam rotates, rod *j′*, is raised and lowered, which moves the arm *f′*, of the crank lever in and out and likewise connecting rod *d′*, and thus throws arms W′, X′, of the rocking lever in order to impart reciprocating motion to the solder irons. The soldering irons are raised and lowered upon the vessel body by means of cam *k″*, secured upon the shaft *l*, and which with rotation thereof contacts with rod *l″*, movably secured upon the shaft *v*. The rearwardly extending portion of said rod fits beneath the lifting rod *m′*. As cam *k″*, during its rotation contacts with trip rod or lever *l″*, the outer end thereof is thrown downward, while its rear portion is raised or lifted, and during such movement contacts with the lower end of lifting rod *m′*, and raises the same, and inasmuch as the upper end thereof is secured to the soldering iron mechanism, the same is raised clear of contact with can body. As cam *k″*, passes from contact with trip rod or lever *l″* the outer end thereof raises and inner portion lowers, which causes lifting rod *m′*, to fall, consequently lowering soldering iron. Immediately after lifting rod *m′*, starts to raise, cam *n′*, bears upon outer end of the trip rod or lever *o′*, movably secured upon shaft *v*, and moves same downward, which causes inner end to raise, and lift rod *p′*, and cause lock rod *q′*, to be freed from engagement with the notch *r′*, of the lock plate J, and thus allow of rotation thereof, and the central shaft to which the same is secured rigidly, one step. The inner end of the lock bar or rod *q′*, is secured to the central shaft E, by the sleeve *s′*, and the outer end movably to lifting rod *m′*, by means of strap *t′*. Of course as the cam *n′*, passes from contact with the outer end of trip rod *o′*, the same raises and inner end lowers, which allows lock rod *q′* to drop into locked engagement with the notch of the lock plate J, and prevent further rotation of the central shaft. This locking mechanism is for the purpose of stopping travel of the carrying disk F, at such a time as to bring the seam of the formed body directly under and in true line with the soldering irons. However, in order to provide against the jolting of the machine, which is liable to result in bringing the rotation of the shaft to sudden stoppage, we provide a friction clutch which is secured so as to exert a gradual pressure upon ratchet wheel K, and said clutch or brake consists of strap $u'$, one end of which is attached to the frame at $v'$, and free end passed around periphery $w$, of ratchet wheel K, and is then secured to the end of the weighted rod $x'$, which is pivoted to brace $y'$. Prior to locked bar raising from locked engagement with notched lock plate J, cam $z'$, raises weighted rod $x'$, which throws inner end or toe of said rod outward, thus releasing the binding of strap upon the periphery of the ratchet plate or wheel and allowing of free movement or rotation of the central shaft. However, ere the lock bar moves into locked engagement with the lock wheel, cam $z'$, moves out of contact with the weighted rod, and same is allowed to fall, which throws inner end of the toe inward and causes strap $u'$, to bind tightly, by friction, upon the periphery of the ratchet wheel thus gradually stopping rotation of the central shaft and overcoming sudden stoppage by lock bar. During rotation of the central shaft, by the before described mechanism, and travel of the clamped jaws toward the soldering irons, roller X, secured to the sliding frame V, travels in an eccentric groove N, of the sliding plate M, and during movement toward the iron, said eccentric groove serves to draw the sliding frame inward, and rod T, secured thereto. The inward movement of this rod serves to compress the elastic packing U, of the mandrel and force each section outward its full distance in order to insure the full size to the vessel body formed thereover by the clamping of the jaws. The elastic packing is held thus compressed until the retained vessel body has been perfectly soldered, whence roller $m$, after the clamped jaws have passed the soldering irons, enters the downwardly inclined trackway, which causes the rods $e$, and $f$, to move downward in order to release the jaws $c$, $d$, and $a$, from the contact with mandrel and at the same time roll X, moving within the eccentric groove gradually works outward and allows the pressure of the compressed elastic packing to force the expansion rod and the sliding frame outward, and thus cause the mandrel to collapse, so that by the time mandrel has reached a point about two-thirds the traveling distance, the soldered vessel is in condition to be easily removed.

To the projecting end of shaft $l$, is secured a spirally grooved cam $A^2$, within which works the lower end of rod $B^4$. This rod is pivoted within the arms of bracket $C^2$, and has its upper end connected to the sliding rod $D^2$, which works in frame $E^2$. Within the inner portion of the sliding rod is pivoted spring actuated catch hook bars $F^2$, $G^2$, the upper ends of which are connected to pins $H^2$, $I^2$, by means of springs $J^2$, $K^2$. By means of this sliding rod we remove soldered vessel bodies from the mandrel and deliver them to any desired receptacle for this purpose. As the spirally grooved cam $A^2$, moves the lower end of the pivoted rod $B^4$, outward, upper end is thrown inward, which carries therewith sliding rod $D^2$. As said rod so moves, hook bar $F^2$, passes over the can vessel and in so doing the lower projecting end is thrown inward, and the end of bar $G^2$, contacts with the end of the vessel and is thrown backward. After the rod has passed the entire length of the can, the resiliency of spring $K^2$, draws the upper end of bar $F^2$, inward and causes the lower end to move outward. The vessel is then secured between the lower ends of bars $G^2$, $F^2$, and as the lower end of rod $B^4$, moves inward by travel within spirally grooved rotating cam $A^2$, the upper end is thrown outward, and carries therewith the sliding rod $D^2$, and consequently draws the can vessel from off the mandrel. When catch bar $G^2$, contacts with stop pin $I^2$, the upper end thereof is tilted inward and the lower end outward, which frees the vessel body and allows same to fall into receptacle for receiving completed bodies. After vessel body has been removed, the mandrel continues its travel with the rotation of the central shaft until brought in front of the feed table, when it is in position to receive another body blank, after which the operation before described is gone through with until the completed body has been removed from the mandrel. The lower projecting end of the hook bar $F^2$, is made somewhat thinner than the body portion, as shown at $f^5$. The reduced end fits within the open portion $h^5$, of the mandrel section, consequently as the vessel is withdrawn from the mandrel the same is prevented from tilting over, inasmuch as the end thereof bears upon the under face of shoulder $f^6$, and is thus held in a straight line.

Frame A has bolted or otherwise secured thereto a support $L^2$, to which is attached the outer frame or casing $M^2$, of feed mechanism. This casing is immovable and within the same is located the sliding box or frame $N^2$. Said box or frame is caused to move forward and backward by means of rod $O^2$, which is secured at its upper end to downwardly extending projection $P^2$, while the lower end is pivotally secured to the bracket $Q^2$, and the said rod is operated through suitable intermediate connections by means of eccentric $R^2$, located upon shaft $l$.

Within the side pieces of frame $M^2$, we cut the elongated slots $S^2$, within which work rollers $T^2$, secured to the lower end of nipper arms $U^2$, which are pivoted to sides of sliding frame $N^2$, by means of pins $V^2$. These arms are further secured to said frame by means of springs $W^2$, which tend to pull the upper end thereof downward, so as to bear upon the upper end of sliding frame. It will be noticed that the elongated slots gradually reduce in height from point 3 to 4, consequently while rollers $T^2$, work within the reduced portion, the upper ends of the nipper arms are raised, while working within enlarged portion resiliency of springs $W^2$, draws nip ends downward so as to grasp the blank sheet, as will be hereinafter more fully set forth.

Within bearings $X^2$, works axle $Y^2$, of the delivery wheel $Z^2$. The periphery of said wheel is cut away so as to provide a series of radiating arms $a^3$, between which body blanks are held by means of springs or clips $b^3$. The delivery wheel is rotated by means of the ratchet $c^3$, secured upon one end of the shaft or axle $Y^2$, through the medium of pawl $d^3$, secured to arm $e^3$ of sleeve $f^3$. This sleeve works loosely upon shaft $Y^2$. Pawl $d^3$, is fastened to the frame by spring $g^3$. As frame $N^2$, is moved forward by operation of rod $O^2$, pin or lug $h^3$, contacts with arm $i^3$, of sleeve $f^3$, and causes same to move upward within the slot $j^3$, and consequently causes the sleeve to turn upon axle $Y^2$, and throw arm $e^3$, downward. This downward throw causes pawl $d^3$, to move over the ratchet wheel one notch. At same time the nipper arms move forward, and as rollers $T^2$, pass within the enlarged portion of the elongated slot, spring $W^2$, draws the upper end of said arm downward and closes nipper ends $k^3$, upon the upper forward end of frame $N^2$. As the nipper arms close, the body blanks pass under and are caught by, projecting ends $k^3$, and are firmly held upon the sliding frame. With the continued forward movement of the sliding frame the body blank is carried from between the arms of the delivery wheel and forced to travel longitudinally between the periphery of crimp rolls $l^3$, $m^3$, which are adjustably secured within frame $n^3$, and are raised or lowered by set screws $o^3$. These rolls are provided with an oppositely beveled periphery, and as the body blanks pass thereunder crimp or slightly bend the edges thereof, so as to make a perfect lap when formed around the mandrel. The sliding frame carries the body blank under crimp rolls and over fluxing wheels $p^3$, which rotate within tank $q^{13}$, which contains liquid flux bath. These rolls are mounted upon shafts $r^3$, and rotated by means of wheels $s^3$, which receive motion from an endless belt $t^3$, traveling over said wheels and roll $u^3$. This roll is operated by travel of belt $v^3$, which works thereover and sprocket wheel $w^3$, secured upon shaft $l$, Fig. 1. As the body blank moves from contact with the flux rolls, it is fed beneath the mandrel or former and is compressed therearound as before described.

By providing projecting lip $t$, to mandrel we compensate for varying thickness which may take place in body blanks, and besides allow of the crimp edges of the same fitting thereover when the clamp jaws have been closed, consequently providing a firm seat for the soldering irons. Again by providing the projecting lip we are assured of the formed blanks, when the mandrel has been expanded, being of full size, inasmuch as said lip allows or compensates for wearing of mandrel. Upon this lip spring clamped tiles force the crimped edges of the blank to rest when the jaws are closed. It will be noticed that the bottoms of these tiles extend below the inner faces of the jaws, but inasmuch as the same are held by spring clamps they will give to the pressure of expanded mandrel when jaws are clamped. However in case the mandrel or inner surface of the clamp jaws, become much worn, it would be impossible for the mandrel to force the blank body sufficient to fill jaws, then the downwardly extending tile answers to force the crimped edges upon the projecting lip of the mandrel and thus secure a vessel of proper size.

To the side of the delivery wheel frame is attached a gage plate $x^3$, against which the edge of body blanks, secure within wheel, bear by means of the spring pressure bar $Y^3$. Said plate and bar hold the blanks in true line with crimp roll, consequently as said blanks are forced forward there is no danger of the same being moved out of line. This is an important feature of our invention, inasmuch as it serves to always maintain blanks in true line and causes each blank to be deposited in an endwise position, thus insuring a uniform position of lap when the blank is formed around the mandrel by means of clamp jaws. Without employment of a gage plate and spring pressure bar there would be a tendency of the blank being unevenly deposited, consequently an uneven feed resulting, hence preventing an exact and true lap being formed.

Spring guide plate $z^3$, overcomes the liability of moving blanks crowding during the travel under the crimp rolls. Nipper rods retain their hold on body blanks until the sliding frame has moved sufficiently far to cause roll $T^2$, moving within the reduced opposite end of the elongated slot, to release their hold. When the sliding frame returns by the outward throw of rod $O^2$, arm $i^3$, of sleeve $f^3$, moves downward within slot $j^3$, which movement causes an upward throw of arm $e^3$, and the consequent rotation of the delivery wheel, inasmuch as pawl $d^3$, secured to arm $e^3$, engages the ratchet wheel and rotates the same one notch, and serves to bring the next body blank in position to be moved forward to the mandrel by the movement of the sliding frame, as before set forth. Inasmuch as the sudden turn or throw imparted to the feed wheel has a tendency to carry the body blank held thereby below the line of the nipper rods, we secure the friction brake thereto, which stops the rotation immediately upon the sliding frame reaching its full return travel. This brake consists of strap $A^4$, which has one end secured to support $L^2$. Said strap passes thence over the periphery of wheel $B^4$, secured upon axle $Y^2$, and has its free end attached to the pivoted rod $C^4$, which is provided with the adjustable weight $D^4$, in order to regulate the friction of the strap upon the periphery of the wheel.

Our machine is set in motion by means of the foot lever $E^4$, which when depressed draws rod $F^4$, inward, consequently throwing clutch $G^4$, into engagement with clutch $H^4$, which rotates loosely upon shaft $v$. Interlocking of the clutch mechanism causes motion of belt wheel Y, to be transmitted to shaft $v$, inasmuch as clutch $H^4$, is connected to sleeve $I^4$, upon which the belt wheel is secured. In order to stop the machine, tread lever $J^4$, is depressed, which throws rod $F^4$, outward and moves clutch $G^4$, inward out of contact with clutch $H^4$, by means of connecting rod $K^4$, all of which being of ordinary construction call for no specific description.

By the employment of our delivery wheel there is provided a continuous feed of blanks to the carrying frame, thus allowing for more rapid working, by which arrangement provision is made for feeding any number of blanks, consequently after the wheel has been filled, the operator may attend to other matters until such time as the wheel requires refilling. In case any of the blanks become improperly located within the wheel, the same may be removed or allowed to be straightened by contact with the spring pressure rod, which forces the same against the gage plate and causes evening within wheel.

As now constructed and operated, no mechanism is provided for the raising and lowering of the soldering irons with the starting or stopping of the seaming machine, consequently when the machine shuts down for repairs, or otherwise, it ofttimes happens that the soldering irons remain down which tends to burn the vessel remaining thereunder. In order to guard against such happening, we provide mechanism for raising or lowering the soldering irons with the starting or stopping of the machine. To the side of frame A, we locate shaft $L^4$, upon which is secured sleeves $M^4$, $N^4$, to which we rigidly secure gear $O^4$, and sprocket wheel $P^4$, and also mount upon said shaft clutch $Q^4$, and spirally grooved cams $R^4$, $S^4$. Gear $U^4$, meshes with gear $O^4$, and sprocket wheel $V^4$, transmits its motion to sprocket wheel $P^4$, by means of the drive chain $W^4$. Clutch $Q^4$, is connected to connecting rod $K^4$, by means of lever arms $X^4$, consequently as connecting rod is thrown outward by movement of rod $F^4$, the clutch is likewise moved upward upon shaft $L^4$, until engagement is made with clutch sleeve $M^4$, whence motion is imparted to shaft $L^4$, which is derived from sprocket wheel $P^4$. Sleeve $M^4$, is provided with circular groove $a^4$, and is connected to cam $R^4$, by means of the sliding rod $b^4$, the bent ends of which fit in the groove of cam and sleeve. As shaft $L^4$, revolves rod $b^4$, moves within the spiral groove of cam $R^4$, until the clutch sleeve is moved from engagement with clutch $Q^4$, when the rotation of the shaft ceases. This partial rotation of said shaft serves to cause the rotation of cam $c^4$, sufficiently far to bear upon arm $d^4$, of pivoted sleeve $e^4$, the downward movement of which throws arm $f^4$, upward in order to raise rod $m'$, which lifts the soldering irons, in manner similar to lever $l'$. This raising is independent of the lift imparted by lever $l'$, which is alternately raised and lowered by action of cam $K'$, during rotation of shaft $l$, and is only for the purpose of raising the soldering irons clear of the mandrel when the working machinery is stopped. As connecting rod $K^4$, moves inward for the purpose of starting the machine, clutch $Q^4$, is moved into locked engagement with clutch end of sleeve $N^4$, and inasmuch as the same rotates in an opposite direction to sleeve $M^4$, it is obvious that a reverse motion is imparted to shaft $L^4$. Sliding rod $g^4$, connects the grooved end of sleeve $N^4$, with the spirally grooved cam $S^4$, and serves to draw sleeve $N^4$, from engagement with clutch $L^4$, during the travel of the bent end of sliding rod within the spiral groove and thus stops rotation of shaft $L^4$. During the movement of said shaft cam $c^4$ being given an opposite throw moves from contact with arm $d^4$, of sleeve $e^4$, when the pressure of lift rod $m'$, upon arm $f^4$, moves same downward and allows said rod to lower soldering iron. It will thus be observed that shaft $L^4$, is first given a half rotation in one direction and then a reverse rotation in accordance as to whether the machine is started or stopped.

We are aware that minor changes may be made in the arrangement of parts and details of construction herein shown and described, without creating or necessitating a departure from the nature and scope of our invention.

Having thus described our invention, what we claim as new and desire to procure protection in by Letters Patent of the United States is—

1. In a seaming machine, the combination with the mandrel, of the clamping jaws, of the rotary traveling blank carrier, and of mechanism for extracting blank from rotary carrier and delivering same to mandrel.

2. In a seaming machine, the combination with the feed supply mechanism, of the rotary traveling blank carrier, of the spring clips for holding the blanks in position, of the gage plate, and of the pressure rod for maintaining ends of the blanks against the gage plate.

3. The combination with a feed supply for seaming machines, of the rotating blank carrier, sliding frame located within the feed supply, mechanism for imparting forward and backward movement to the sliding frame, and of the nipper arms adapted to raise and lower with the travel of said frame in order to nip the blank and carry the same from the carrier to the mandrel.

4. In a feed supply for seaming machines, the combination with the rotating blank carrier of the longitudinally traveling nipper arms, and of mechanism for operating said arms in order to nip the body blank and carry the same forward.

5. In a feed supply for seaming machines, the combination with the rotating blank carrier, of the spring actuated longitudinally traveling nipper arms, and of mechanism for operating said arms.

6. In a feed supply for seaming machines, the combination with the rotating blank carrier, of the gage plate located to one side thereof, pressure rod for maintaining the end of blanks against the gage plate, nipper arms for receiving and carrying the blank body beneath the mandrel, and of mechanism for operating said nipper arms.

7. In a seaming machine, the combination with the mandrel and clamping jaws, of a feed supply, of the delivery wheel for blank bodies, said wheel provided with a series of radial arms, spring clips for holding blanks between radial arms, and of mechanism for automatically extracting blanks from the delivery wheel and carrying the same beneath the mandrel of the seamer.

8. In a feed supply for seaming machines, the combination with the mandrel and clamping jaws of the rotating body blank delivery wheel, mechanism for rotating the same, of the frictional brake for causing a stoppage of said wheel, and of mechanism for automatically extracting blanks from delivery wheel and carrying same beneath mandrel.

9. The combination with a feed supply for seaming machines, of the outer stationary casing provided with elongated slots of varying width sliding frame working within the casing mechanism for operating said frame, rotating blank carrier, nipper arms pivoted to the sliding frame, rollers secured to the lower end thereof working within elongated slots of a stationary casing, said rollers with movement of the sliding frame adapted to raise and lower the upper end of nipper arms.

10. The combination with the feed supply for seaming machines, of the adjustable crimping rolls, said rolls located one above the other and adapted as blanks travel thereunder to rotate and crimp the ends thereof, the periphery of said rolls being oppositely beveled, of the longitudinally traveling nipper arms, and of mechanism for operating said arms in order to nip the body blank and carry same forward to the crimping rolls.

11. The combination with the feed supply for seaming machines, of the rotary blank carrier, of the adjustable crimping rolls, of the fluxing tank located back of the crimping rolls, of the fluxing wheel rotating within the fluxing tank and adapted to supply the flux to the crimped end of body blanks during travel thereof, and of mechanism for carrying the body blank from the rotary blank carrier beneath the crimping rolls, and over the fluxing wheels.

12. In a feed supply for seaming machines, the combination with the rotating body blank delivery wheel, mechanism for rotating the same, of the nipper arms for extracting blanks from rotary delivery wheel, mechanism for operating the same and of the frictional brake for causing a stoppage to the wheel, said brake being supplied with an adjustable weight for increasing or decreasing the friction of the same.

13. The combination in a seaming machine, of soldering irons, swinging weight rods adapted to bear thereon in order to cause said irons to bear firmly upon the body carried by the mandrel, and of mechanism for imparting longitudinal motion to soldering irons.

14. In a seaming machine, the combination with the soldering irons, of the weight rod bearing thereon, and of the adjustable weight secured upon said rod.

15. In a seaming machine, the combination with the soldering irons, of the weight rod, depending rollers secured thereto, and bearing upon said irons, and of the weight connected to said rod.

16. The combination with soldering irons, of a seaming machine, rocking lever for imparting longitudinal motion thereto, crank lever pivotally secured to the frame of machine, of the connecting rod for transmitting motion of crank lever to rock lever and of the operating rod for transmitting motion to crank lever in order to operate rock lever.

17. In a seaming machine, the combination with the operating shaft, of the soldering irons, rotating shaft $L^4$, clutch sleeves oppositely working thereon, clutch adapted to move into locked engagement with clutch sleeves, mechanism for throwing clutch into engagement with either of said sleeves, spirally grooved cams connected to the clutch sleeves for the purpose of disengaging same from clutch when the shaft has rotated a given distance, and of mechanism for transmitting the motion of said shaft to the soldering irons in order to raise or lower the same with the stopping or starting of the seaming machinery independent of mechanism for raising and lowering the irons during the working of the machine.

18. In a seaming machine, the combination with the soldering irons, of mechanism for lowering and raising the same with the stopping or starting of the seaming machinery independent of device for alternately raising and lowering of the irons during travel of body forming mandrel.

19. In a seaming machine, the combination with the operating shaft, of shaft $L^4$, clutch sleeves loosely working thereon in the opposite direction, mechanism for imparting motion of the operating shaft to the clutch sleeves, clutch adapted to move into locked engagement with the clutch sleeves, and of mechanism for imparting movement of shaft $L^4$, to the soldering iron lift rod in order to raise and lower the irons with the stopping or starting of the machine.

20. In a seaming machine, the combination with the traveling mandrel, of the delivery device for the formed bodies, said device consisting of a sliding or reciprocating rod, spring actuated catch bars or pins secured and working within and through sliding or reciprocating rod, said catch bars being such a distance apart as to permit of the formed body upon the mandrel to be grasped and held there-between, of mechanism for reciprocating the sliding rod in order to allow of catch bars engaging the can body and withdrawing the same from the mandrel, and of releasing rod for the trip catch bars when the body has been withdrawn.

21. In a seaming machine, the combination with the frame thereof, of the stationary frame for the releasing device secured thereto and projecting therefrom, of the sliding or reciprocating rod secured and working through stationary frame, of the spring actuated catch pins pivotally secured within reciprocating rod, at the inner and outer end thereof, of the releasing pin or rod secured to the stationary frame, and of mechanism for reciprocating sliding rod in order to cause catch pins to grasp and withdraw body from mandrel.

22. In a releasing device for seaming machines, the combination with the sliding or reciprocating rod, of the pivotal catch rods, secured within and working through the reciprocating rod, said catch rods being such a distance apart as will permit a body to be grasped therebetween, and of mechanism for reciprocating the sliding rod.

23. In a releasing device for seaming machines, the combination with the frame thereof, of the stationary frame for the releasing device secured thereto, of the reciprocating rod, of the vertical rocking connecting rod fulcrumed within the bracket secured to the frame of the machine, said rod connected to the sliding rod at its upper end, of the spirally grooved cam secured to the operating shaft of the seamer and within which the lower end works, said cam with rotation thereof adapted to oscillate the vertical rod in order to reciprocate the sliding rod, and of the catch bars pivotally secured within sliding rod, said catch bars adapted to grasp and remove the body from the mandrel.

24. In a seaming machine, the combination with the clamp jaws of a soldering machine, of the spring clamped tiles secured to the face of side jaws said tiles projecting below inner surface of the jaws.

25. In a seaming machine, the combination with the jaws, of the spring self adjusting tiles, secured to face of side jaws, said tiles being for the purpose of preventing undue wear to the jaws.

26. In a seaming machine, the combination with the body forming jaws, of removable tiles secured to each of the side jaws and projecting below the inner surface thereof and of spring clamp plates for securing the tiles to the jaws.

27. In a seaming machine, the combination with the clamp jaws, of spring clamped tiles secured thereto, said tiles projecting below the inner surface of the jaws, of the sectional mandrel, said mandrel having a raised lip secured to one section thereof upon which the spring tiles press the lap of body blank.

28. In a seaming machine, the combination with the mandrel, said mandrel composed of sections, of an elastic cushion or packing located therein, sliding expansion rod for compressing or releasing the pressure upon the elastic packing for the purpose of expanding or collapsing the sectional mandrel, and of the mechanism for operating the sliding expansion rod in or out.

29. In a seaming machine, the combination with the central rotatable shaft, lock plate secured thereon and rotating therewith, lock bar for engaging said plate, mechanism for raising and lowering said bar, ratchet wheel secured upon the shaft below the lock plate, mechanism for imparting a step rotation to the shaft and of the frictional brake applied to the ratchet wheel for gradually stopping the rotation of the central shaft.

30. In a seaming machine, the combination with the rotary central shaft, ratchet wheel rigidly secured thereon, segmental gear connected to a loose sleeve upon the central shaft, pawl carried thereby and engaging the ratchet wheel, mechanism for operating the segmental gear in order to impart rotation thereto through the medium of the ratchet wheel, and of the frictional brake applied to the ratchet wheel for gradually stopping the rotation of the main shaft.

31. In a seaming machine, the combination with the rotary central shaft, ratchet wheel secured thereon, of the segment gear secured to central shaft, of the pawl carried thereby and engaging ratchet wheel, of the rack bar for engaging teeth of segmental gear, said bar operated by eccentric secured upon operating shaft of seamer, and of the frictional brake applied to the ratchet wheel in order to gradually stop rotation of central shaft.

32. In a seaming machine, the combination with the ratchet wheel secured upon the central shaft, of the frictional brake for gradually stopping rotation of the ratchet wheel and shaft, said brake consisting of strap $u'$, one end of which is secured to the frame of the machine, the free portion of which passes over the periphery of the wheel, of the weighted pivoted rod to which the free end of the strap is secured, and of mechanism for raising and lowering the weighted rod in order to increase or decrease the friction of the brake strap upon the ratchet wheel.

33. The combination with a seaming machine, of the body clamp jaws composed of sections, vertical rods for closing the sections of clamp jaws, mechanism for raising the vertical lift rods, and of the lock link for connecting and holding said rods in their lifted position.

34. In a seaming machine, the combination with the sliding rod for releasing the vessel body from mandrel, of the hook bars for engaging the vessel body, one of said bars having its projecting end reduced in order to provide the shoulder for the purpose of preventing the tilting of the body while being withdrawn.

In testimony whereof we affix our signatures in the presence of two witnesses.

CHARLES B. KENDALL.
HENRY SCHAAKE.

Witnesses:
N. A. ACKER,
J. W. KEYS.